(12) United States Patent
Luber et al.

(10) Patent No.: US 7,161,348 B2
(45) Date of Patent: Jan. 9, 2007

(54) INDUCTIVE SENSOR UNIT

(76) Inventors: Thomas Luber, Schalkenthaner Weg 32, 92256 Hahnbach (DE); Hans-Ludwig Gotz, Schulstrasse 16, 92256 Hahnbach (DE)

(*) Notice: Subject to any disclaimer, the term of this patent is extended or adjusted under 35 U.S.C. 154(b) by 0 days.

(21) Appl. No.: 11/239,643

(22) Filed: Sep. 30, 2005

(65) Prior Publication Data

US 2006/0132120 A1    Jun. 22, 2006

(30) Foreign Application Priority Data

Dec. 17, 2004   (DE)  .................. 20 2004 019 489 U

(51) Int. Cl.
*G01B 7/14*    (2006.01)
(52) U.S. Cl. .............................. 324/207.24; 324/207.15
(58) Field of Classification Search ........... 324/207.15, 324/207.24
See application file for complete search history.

(56) References Cited

U.S. PATENT DOCUMENTS

| | | | | |
|---|---|---|---|---|
| 5,055,814 A | * | 10/1991 | Morimura et al. | 336/119 |
| 6,819,120 B1 | * | 11/2004 | Tam | 324/633 |
| 2005/0258687 A1 | * | 11/2005 | Zapf et al. | 307/106 |

* cited by examiner

*Primary Examiner*—Bot LeDynh
(74) *Attorney, Agent, or Firm*—Miles & Stockbridge P.C.; Edward J. Kondracki

(57) ABSTRACT

An inductive sensor unit for detecting the position of a vehicle seat or for a gate-shifting unit of an automatic transmission, is described. The inductive sensor unit has a plurality of sensor coils that are disposed in planar fashion on a printed circuit board. A conductive actuation element which is guided, spaced apart, on a path over the sensor coils, and an electrical evaluation circuit detects changes in inductance of the sensor coils in accordance with a path position of the actuation element and converts the changes into electrical signals, corresponding to seat position signals or gear shifting signals. The conductive actuation element is guided, spaced apart on both sides, over the sensor coils, and in one aspect of the invention, the electrical evaluation circuit detects the inductances of all the sensor coils (L1, . . . , Li) and converts them by means of an algorithm into a current path position of the actuation element.

20 Claims, 7 Drawing Sheets

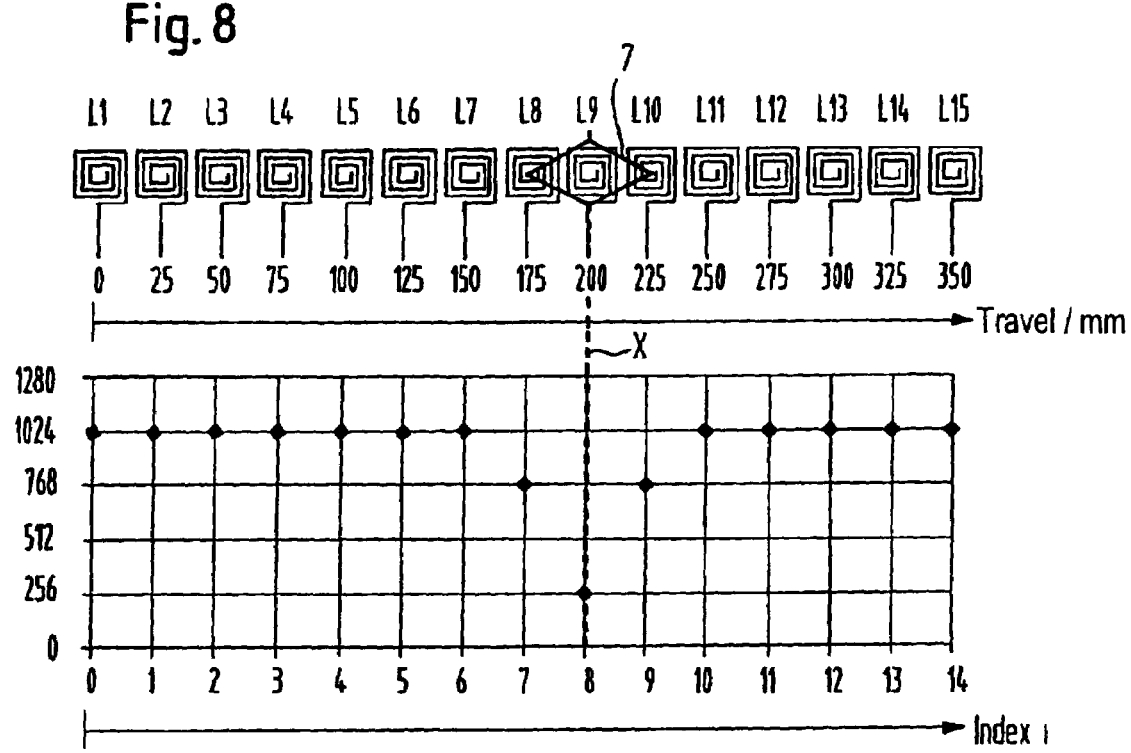
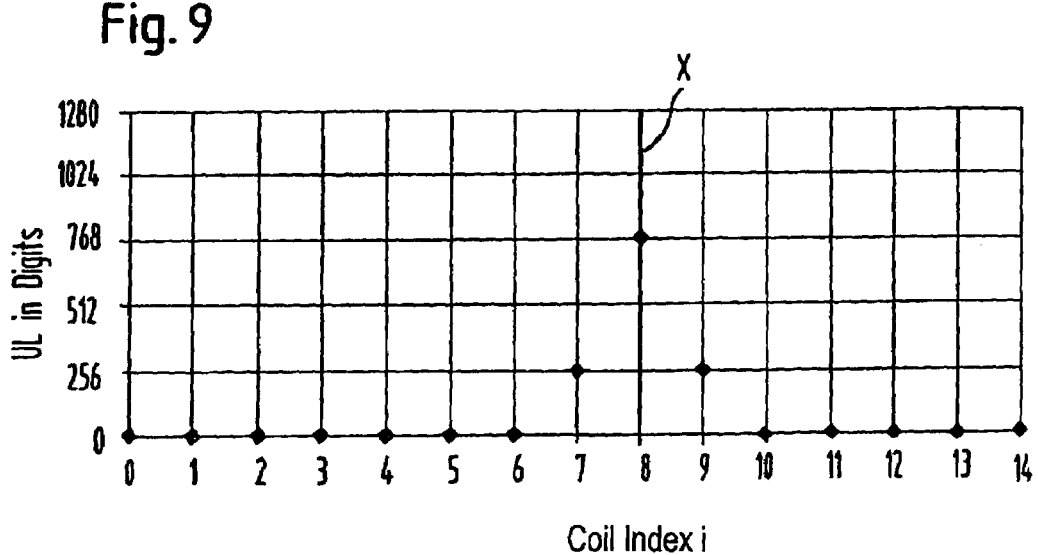

INDUCTIVE SENSOR UNIT

BACKGROUND OF THE INVENTION

1. Field of the Invention

The invention relates to an inductive sensor unit which is suitable in particular for detecting the position of a vehicle seat or for a gate shifting unit of an automatic transmission.

2. Description of Related Art

One such sensor unit, which is the point of departure for the invention and is defined by the preamble to claims 1, 13 and 16, is known from published international patent disclosure WO 2004/027994 A1.

From this prior art, it is also known that the travel measurement signals are spacing-dependent; that is, if the actuation element is guided along a curved path, or if the printed circuit board is not level, then changes in spacing enter into the measurement signals. The printed circuit board may be curved in a predetermined way, or a large, level printed circuit board may have unintentional curvatures. In the prior art, the spacing dependency is compensated for in the electrical evaluation circuit by means of standardization and calibration. Detecting the position of the electrical actuation element along the path that leads via the plurality of sensor coils is realized such that the changes in inductance of respective adjacent sensor coils are From the published U.S. patent application U.S. 2003/0169033 A1, a sensor array for contactless position measurement is also known. This sensor array is used to determine the travel position of a vehicle seat. Each sensor element generates an output signal which correlates with one position from the set of possible seat positions. For the sensors, the Hall effect is utilized. For controlling the Hall sensors, either a magnet is provided which is moved past the sensors, or a magnetic shielding element is provided which is guided by a magnetic field that acts upon the sensors. Here again, the signal evaluation enables only limited position resolution based on the grid pattern of adjacent sensor coils.

From the prior art defined by German Patent DE 103 19 720 B3, a gate shifting unit for generating gear shifting signals for an automatic transmission of a motor vehicle is known. In this gate shifting unit, a shifting shaft with a selector lever is supported in a shifting block. The selector lever can be pivoted in a first plane S, but also perpendicular to it in a second plane T. To that end, it is pivotably connected to the shifting shaft. The motion of the selector lever often corresponds to the positions P, R, N and D, for the parking, reverse, neutral, and drive positions of the selector lever. The selector lever pivots a rotor with a shift finger that is accommodated in a modular housing. The shift finger pivots over a printed circuit board with an inductive sensor unit and represents an exemplary embodiment in which the shifting finger can carry the forklike actuation element of the present invention. Other spatial relationships and other paths of the conductive actuation element relative to the printed circuit board are also possible.

SUMMARY OF THE INVENTION

By comparison, it is the object of the invention to reduce the spacing dependency of the travel measurement signals and to improve the locating resolution along the measurement path.

This object is successfully attained by an inductive sensor unit which the inductive sensor unit has a plurality of sensor coils that are applied in planar fashion on a printed circuit board. These sensor coils cooperate with a conductive actuation element which is guided, spaced apart, on a predetermined path over the sensor coils. Because of eddy current effects, the conductive actuation element causes changes in inductance in the sensor coils. The inductance of a sensor coil is reduced by the eddy currents all the more, the closer the actuation element is to the sensor coil. The inductive sensor unit accordingly also includes an electrical evaluation circuit, which detects changes in inductance of the sensor coils in accordance with the path position and in accordance with the spacing of the actuation element from the sensor coil and converts them into electrical signals. The electrical signals are in particular seat position signals or gear shifting signals for the gate shifting unit of an automatic transmission. In particular, the plurality of sensor coils may be disposed either on only one side or on both sides of the printed circuit board.

The invention has recognized for the first time that by doubling the actuation element (which as a rule is rhomboid in shape), the spacing dependency of the measurement signals is markedly lessened if (i) a sensor coil is embraced in forklike fashion by the actuator, or (ii) a pair of coils is embraced in forklike fashion and in the evaluation circuit the inductances of the opposed sensor coils are lined up serially or added together by computation. As a result of this provision, standardizing the measurement signals is made easier, and thus the locating resolution between adjacent sensor coils is also made more precise. By this provision alone, it is already possible to decide with more certainty in the evaluation circuit whether the conductive actuation element is more likely covering the one sensor coil (or pair of coils) or the other sensor coil (the adjacent pair of coils).

The object of the invention can also, however, be attained in that the inductances of all the sensor coils are detected—serially by time-division multiplexing, or in parallel—and converted by means of an algorithm into a current path position of the measurement element. The algorithm can for instance ascertain the local center of mass of all the changes in inductance, or in a variant, it can calculate a quadratic interpolation along the row of coils. In both variants, the maximum signal distribution reflects the path position of the actuation element more accurately than in the prior art. For instance, with 15 coils, 300 positions of a vehicle seat can be resolved. Simultaneously, by means of such evaluation algorithms, the spacing dependency of the position signal generated is lessened, since the various measured values, each spacing-dependent, along the path are less important in their spacing dependency because of the calculation.

BRIEF DESCRIPTION OF THE DRAWINGS

Exemplary embodiments of the invention will be explained in conjunction with the following drawings.

FIG. 8: a graph showing the voltage signal values of the 15 coils of FIG. 7 as a function of the index of the 15 coils, and as a function of the distance traveled by the actuation element along the 15 coils;

FIG. 9: a graph in which the voltage values of FIG. 9 have been converted to a zero standardization into values that are suitable for the use of a center of mass formula;

DESCRIPTION OF THE PREFERRED EMBODIMENTS

Figure 1:
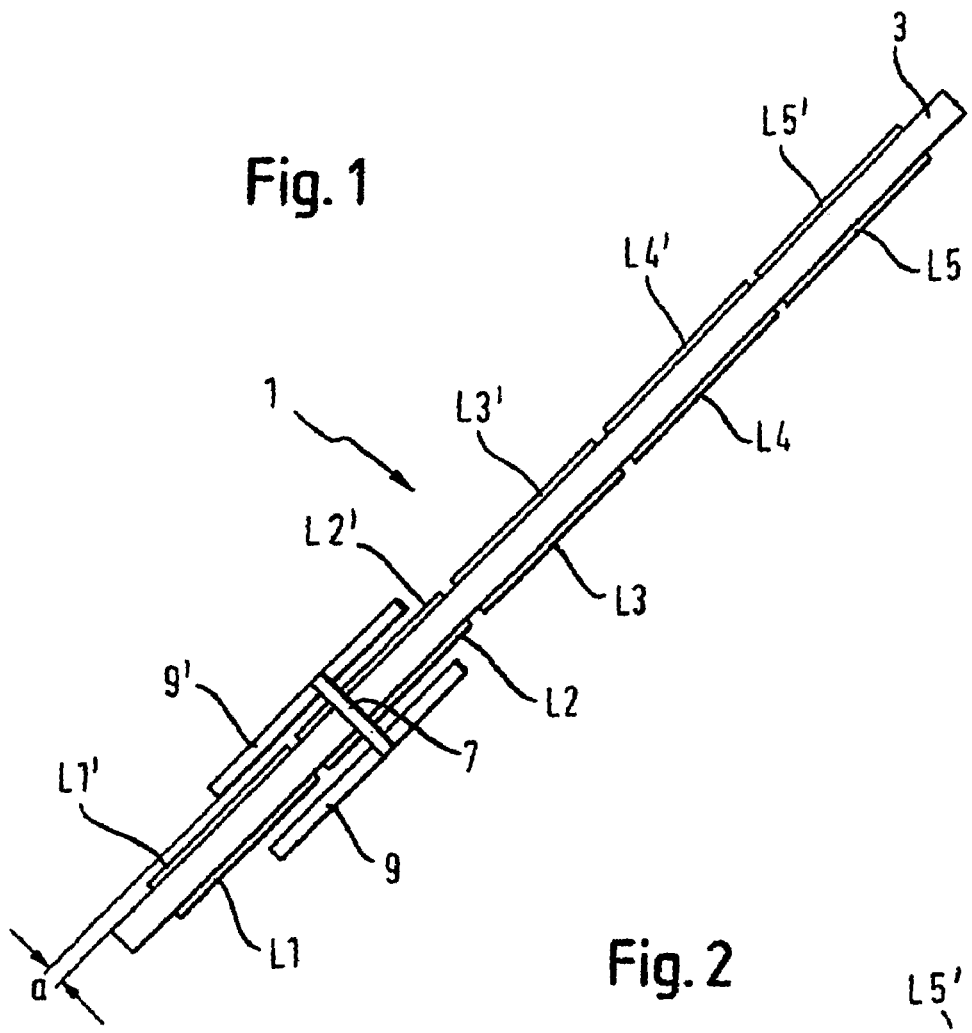
FIG. 1: a sectional view of a printed circuit board with a plurality of sensor coils and a top view on a forklike actuation element according to the invention.
Figure 5:
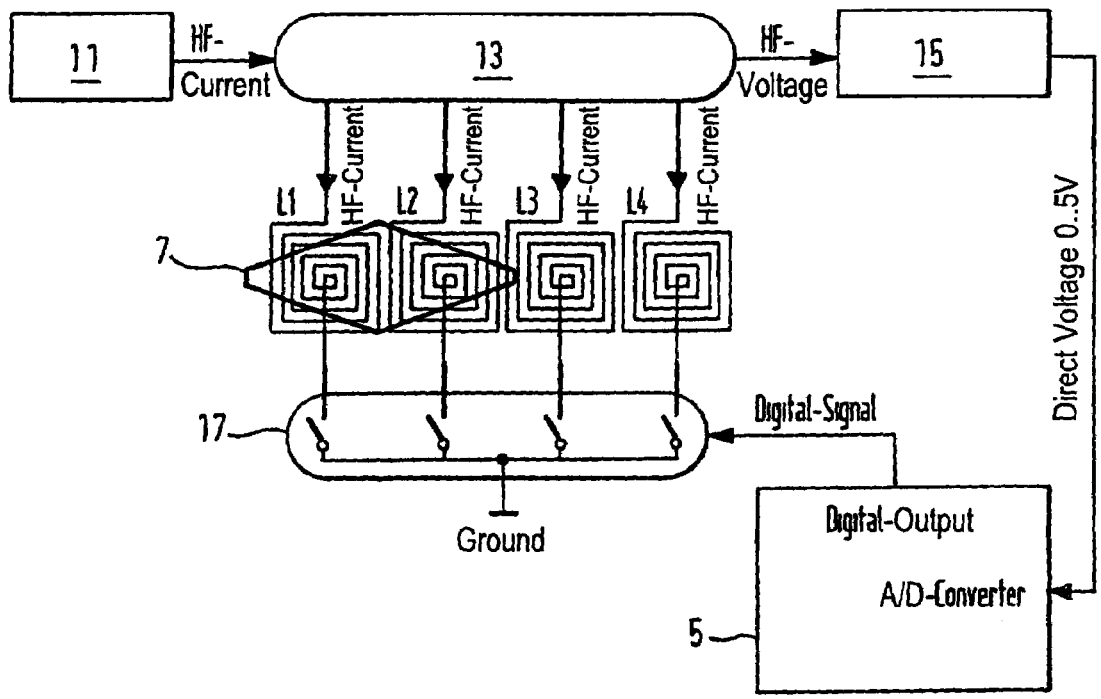
FIG. 5: a hardware concept for measuring the inductive resistance (for reactance measurement) of adjacent sensor coils, for instance four of them.

In FIG. 1, a view of an inductive sensor unit 1 according to the invention is shown. It serves the purpose of precise position determination in inductive sensors $L_i$. An inductive sensor L is a coil which comprises a plurality of windings of one conductor track on a printed circuit board 3. To increase the inductance, a printed circuit board 3 with a plurality of layers can be used. The inductance is measured with a suitable electronic circuit, for instance as shown in FIG. 5. A microcontroller 5 evaluates the voltages measured and from that calculates travel information. If a conductive actuation element 7, in particular a metal plate, is placed on the sensor L, then a lower voltage is output than in the case where no metal plate 7 is located in the vicinity. The voltages can be standardized such that the high voltage corresponds to a damping value of 0%, and the low voltage corresponds to a damping value of 100% (see FIG. 3).

Figure 3:
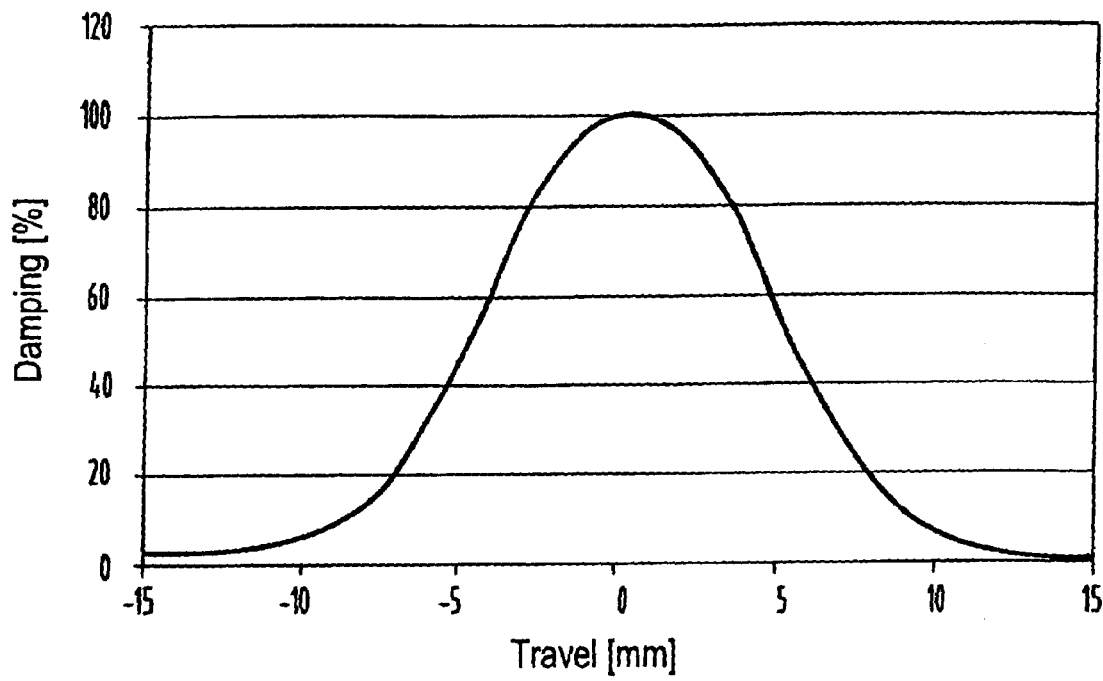
FIG. 3: a graph showing a standardized damping value of a sensor signal, generated by a single coil, as a function of the degree of coverage of the sensor coil by the actuation element.

If a single actuation element 7 is passed over the sensors $L_i$ and the damping values are plotted over the travel distance, the curve form shown in FIG. 3 is the result. Thus within a certain range, one travel point can be associated with each damping value in FIG. 3.

Figure 4:
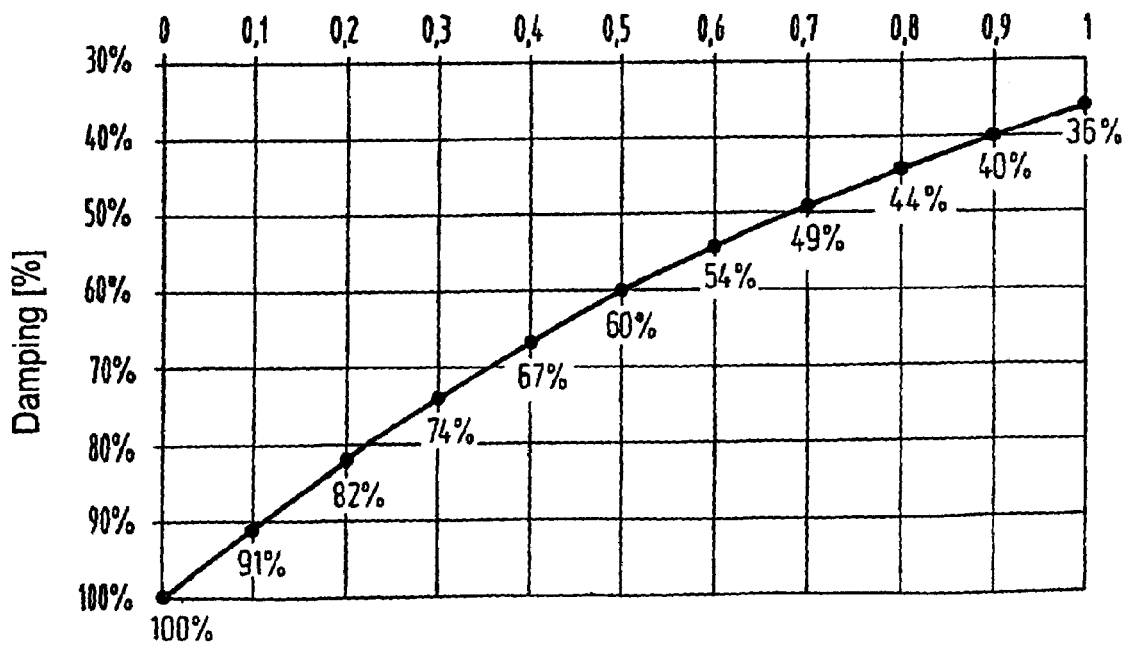
FIG. 4: a graph showing a standardized damping value of the sensor signal of FIG. 3, as a function of the spacing between the sensor coil and the actuation element.

The curve form applies, however, only if the spacing a of the actuator 7 from the sensor $L_i$ is constant. If the spacing is changed at a particular position, then the damping value varies, as in FIG. 4. If the spacing a is increased for instance from 0 mm to 0.1 mm, then the standardized damping changes from 100% to 91%.

Figure 2:
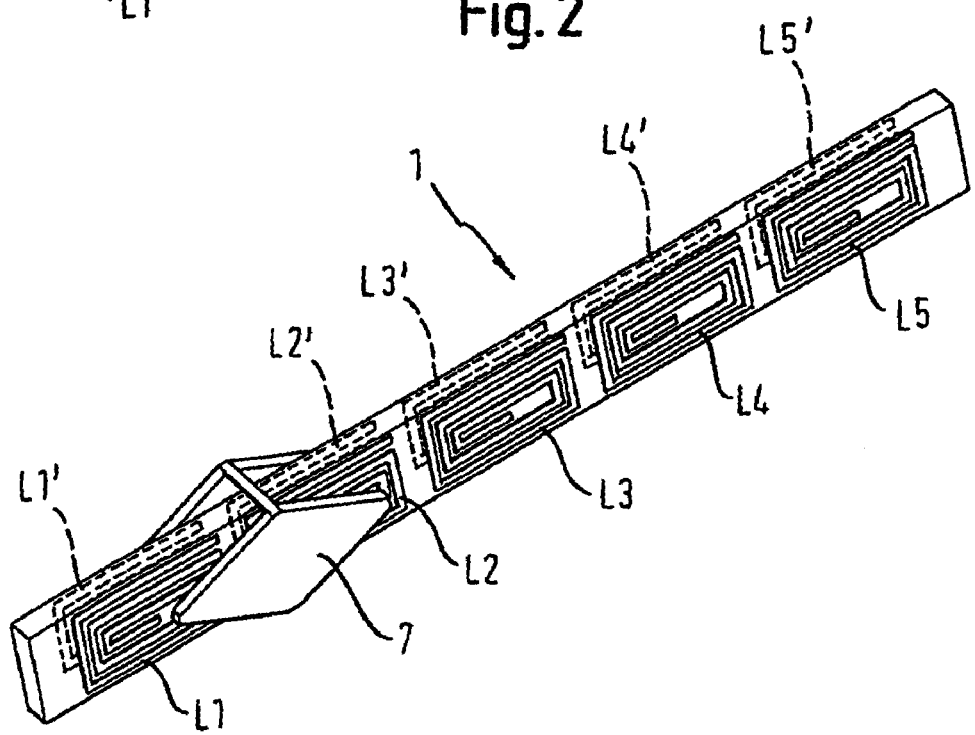
FIG. 2: a perspective view of the printed circuit board, the sensor coils, and the actuation element of FIG. 1.
Figure 11A:
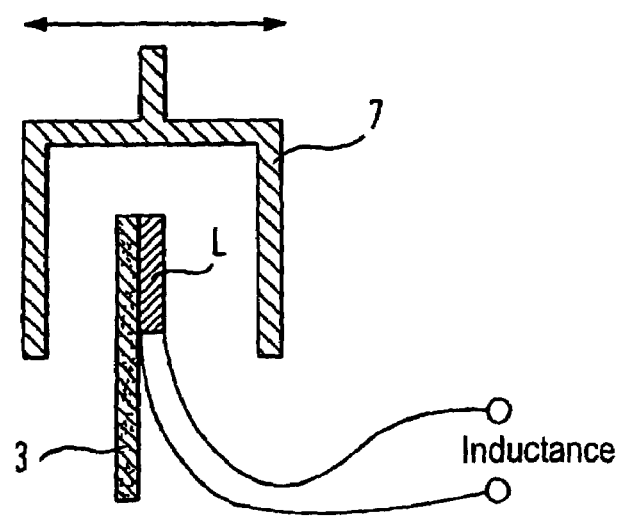
FIG. 11a: an inductive sensor unit according to the invention, in which the sensor inductances are applied to one side of a circuit board.
Figure 11B:
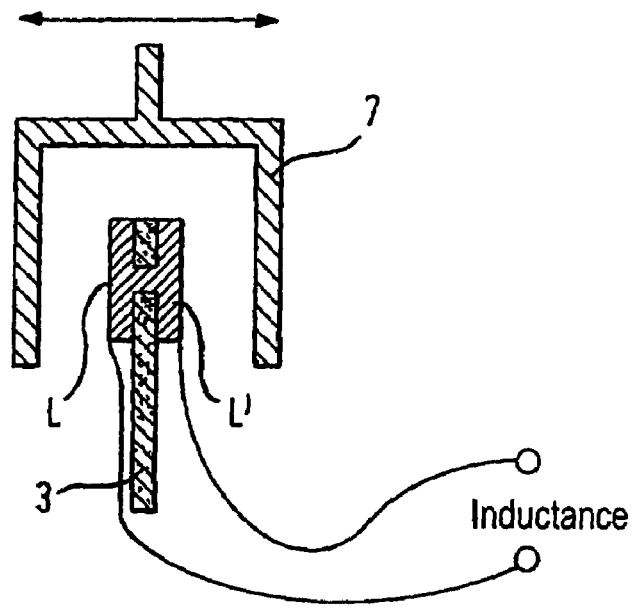
FIG. 11b: an inductive sensor unit according to the invention, in which two planar sensor inductances are accommodated on opposite sides of a printed circuit board and connected in series.

If a change in spacing, which always occurs in practice, is allowed, then an unambiguous association between the sensor signal and the travel is no longer possible. To eliminate this effect, or to reduce it considerably, a forklike actuator 7 as shown in FIG. 1 and FIG. 2 is used. In FIG. 1 and FIG. 2, it is also shown that the printed circuit board 3 is coated on both sides with sensors $L_i$ and $L_i'$. However, the principle of the forklike actuation element 7 functions even with a printed circuit board 3 coated on only one side (see FIG. 11a, which differs from FIGS. 11b and 11c).

For instance, if in FIG. 1 the spacings a of the two faces 9 and 9' of the forklike actuator 7 from the two sides of the printed circuit board amount to 0.1 mm, then both sensors $L_i$ and $L_i'$ have a damping of 91%, If the actuator 7 now approaches the one side of the printed circuit board to a spacing of 0 mm (100% damping), then it moves farther away on the other side, to 0.2 mm (82% damping). By adding the sensor signals together, the change in spacing is compensated for. In both cases, a signal value of 182% is obtained.

Figure 11C:
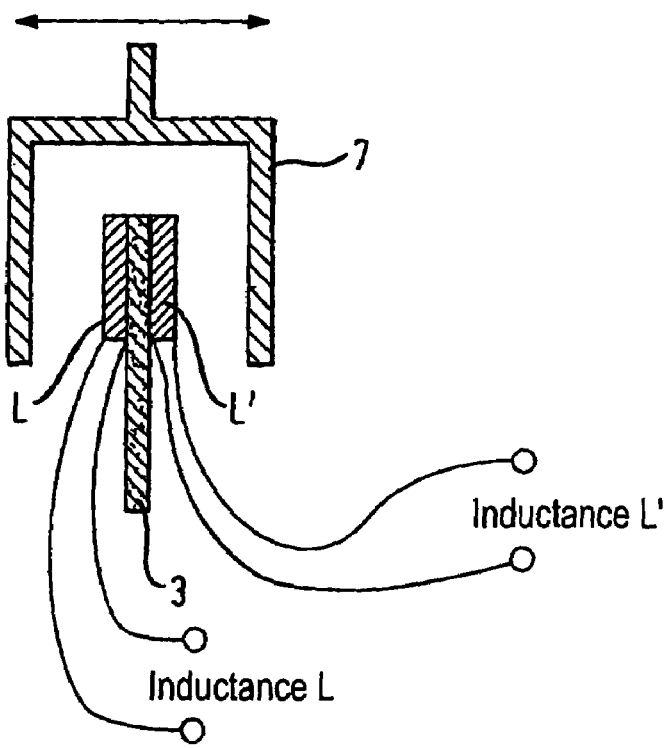
FIG. 11c: an inductive sensor unit according to the invention, in which opposed sensor coils are evaluated separately with respect to their inductance.

The adding of the signals can be done in the microcontroller 5 (see FIG. 11c). The two sensors $L_i$ and $L_i'$ may, however, also be connected in series, in which case only one signal is produced (see FIG. 11b). By means of the series connection shown in FIG. 11b, the inductances are added together, which has the same effect as the signal addition.

FIG. 5 shows a concept for embodying the sensor unit 1 of the invention. A sine-wave oscillator 11 generates an alternating current of constant amplitude and constant frequency (for instance, f=12 MHz). This high-frequency alternating current is amplified at 13 and fed successively (multiplexer 17) into each of the sensor coils L1, L2, L3, L4. In FIG. 5, four sensor coils L1–L4 are shown as an example, while in FIGS. 7, 8 and 9, 15 sensor coils L1–L15 are shown as an example.

If an actuation element, which is of highly conductive material, such as copper or brass, is moved over the coils L1–L4, then the inductance L of the coils decreases because of eddy current losses. As a result, the inductive resistance (reactance) of the coils decreases in proportion. If the actuator is located with its center point over a center of a coil, then the coil $L_i$ has maximum damping. The minimum inductive resistance has a minimum voltage drop (when current is impressed) as a consequence.

The voltage drop at the coils L1–L4 is rectified at 15 and delivered to a microcontroller 5 for further processing.

Figure 6:
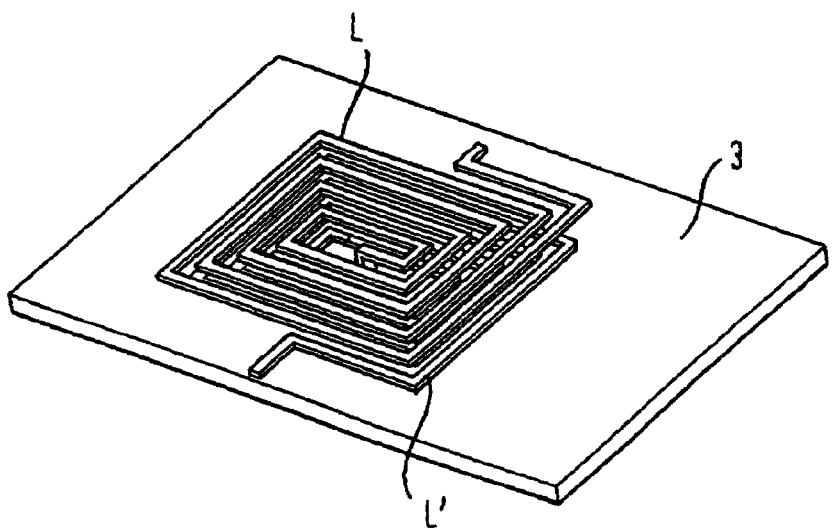
FIG. 6: a perspective view of a circuit substrate (in particular a printed circuit board) and the makeup of a coil, applied in planar fashion on both sides and for instance connected in series.

One example for the makeup of a sensor coil L is shown in FIG. 6. The parameters selected are not fixed variables; they are purely for the sake of illustration. The coils L and L' are located on a circuit substrate (such as a circuit board or printed circuit board 3) and are arranged in planar fashion on both sides. They are connected to one another (see FIG. 11b) and have a snail-like winding direction. This arrangement increases the number of windings, which makes for higher inductance.

Figure 7:
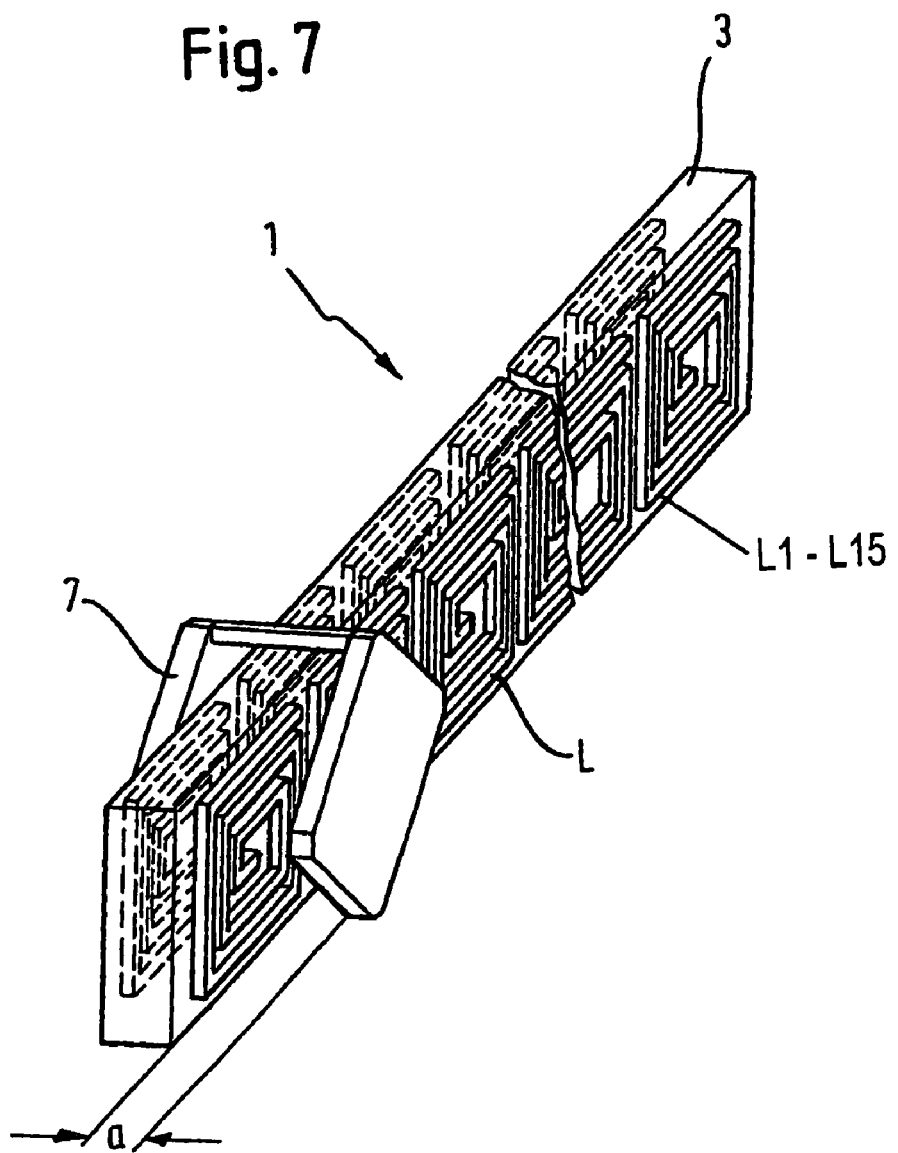
FIG. 7: a perspective view showing the makeup of an inductive sensor unit of the invention, having for instance 15 double-sided sensor coils and the forklike double actuator according to the invention.

From this element, an inductive sensor unit 1 as in FIG. 7 can be constructed. In this exemplary embodiment, there are 15 coils L1–L15 on the circuit substrate 3. The geometrical dimensions of the coils depend on the inductance desired and on the material. For a rectangular coil L 25 mm by 10 mm in size, with 40 windings, an inductance of approximately 14 µH is obtained. The coils $L_i$ are located side by side and have a spacing of 25 mm. The coils are damped by a rhomboid double actuator 7 as in FIG. 7 (see also FIG. 2).

If one sensor $L_i$ is not covered by the actuator 7, then the damping is 0%; if the sensor $L_i$ is fully covered, the damping is 100% (see FIG. 3). The damping is also dependent on the spacing a of the actuator 7 from the sensor coils $L_i$; if the spacing a is relatively great, the maximum damping decreases, as can be seen from FIG. 4.

By means of the double actuator of FIG. 7, a spacing deviation is compensated for, and given suitable evaluation, the damping is kept constant.

The signal evaluation is shown in FIGS. 8 and 9. By way of example, the actuator 7 is located at a travel distance mark of 200 mm.

The microcontroller 5 cyclically, at fixed time intervals, measures the voltages of the sensors L1–L15, which are proportional to their inductances. These voltages are converted into binary values in the microcontroller 5 and are stored in a memory with a running index of 0 to 14. In FIG. 8, the voltages measured are shown as a function of the index of 0 to 14.

In the next step, a zero standardization is performed as shown in FIG. 9. How this is done is that the microcontroller 5, from the points shown in FIG. 8, ascertains which sensor signal has the highest voltage (the highest binary value). In this example, it is the binary number 1024. Accordingly, the highest voltage is subtracted from each of the 15 sensor values. The standardized graph can be seen in FIG. 9.

From the numerical values in FIG. 9, the center of mass position of the distribution can be calculated by conventional mathematical algorithms. In this example, for the distribution over 15 coils and a coil spacing of 25 mm, a center of mass at x=200 mm is obtained.

In practice, in detecting the signals of the coils Li, noise occurs. The coils Li without damping have no entirely constant value. This noise can be suppressed by taking into account only the three lowest voltage values, for instance, and performing the zero standardization as in FIG. 9 with the maximum of these three voltages.

Figure 10:
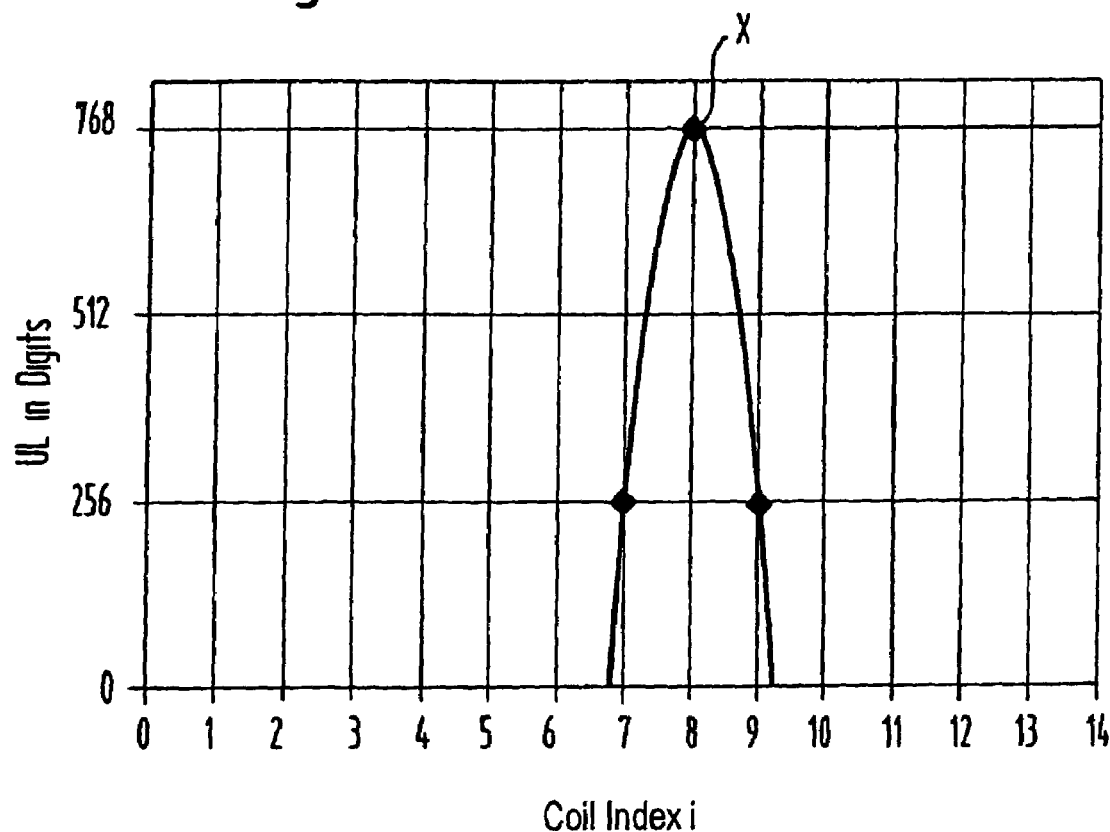
FIG. 10: as an alternative to the center of mass calculation of FIG. 10, a quadratic interpolation of the standardized signals with the aid of a parabola.

Another possible way of detecting the position is interpolation with a quadratic function through three points, as shown in FIG. 10. To that end, after the zero standardization, the maximum value of the parabola is sought. In this example, this maximum has the numerical value of 768 and is located at the index coil 8. As the second and third points, the value to the left and the value to the right of the maximum are needed for performing the interpolation. In this example, the voltage to the left of the maximum has the numerical value of 256 and is located at the index coil 7, while the numerical value of 256 to the right of the maximum is located at the index coil 9. The interpolation can be done by known mathematical algorithms. The three points in the graph in FIG. 10 and the interpolation parabola show that the apex of the parabola is the position being sought of the actuation element 7.

The invention claimed is:

1. An inductive sensor unit (1), for detecting the position of a vehicle seat or for a gate shifting unit of an automatic transmission comprising:
   a plurality of sensor coils (L1, . . . , Li) disposed in planar fashion on a printed circuit board (3),
   a conductive actuation element (7), adapted to be guided in spaced apart relationship (a), on a path over the sensor coils (L1, . . . , Li),
   an electrical evaluation circuit (5, 11–17), for detecting changes in inductance of the sensor coils (L1, . . . , Li) in accordance with a path position (x) of the actuation element (7) and for converting the changes into electrical signals corresponding to seat position signals or gear shifting signals, wherein the actuation element (7) is guided, spaced apart (9, 9') on both sides, over the sensor coils (L1, . . . , Li), and the electrical evaluation circuit (5, 11–17) detects the inductances of all the sensor coils (L1, . . . , Li) and converts them by means of an algorithm into a current path position (x) of the actuation element (7).

2. The inductive sensor unit (1) according to claim 1, characterized in that the conductive actuation element (7) is forklike in form (9, 9') and is disposed over the printed circuit board (3).

3. The inductive sensor unit (1) according to claim 1, characterized in that the conductive actuation element (7) has a rhomboid base (9, 9') on at least one side of the printed circuit board (3).

4. The inductive sensor unit (1) according to claim 1 characterized in that the printed circuit board (3) is planar.

5. The inductive sensor unit (1) according to claim 1 characterized in that the printed circuit board (3) is curved.

6. The inductive sensor unit (1) according to claim 1 characterized in that the electrical evaluation circuit includes one or more oscillation circuits, having a resonant frequency jointly determined by the inductance of the sensor coils.

7. The inductive sensor unit (1) according to claim 1 characterized in that the electrical evaluation circuit (5, 11–17) includes reactance means for measuring of the sensor coils (L1, . . . , Li) upon current impression (11, 13).

8. The inductive sensor unit (1) according to claim 1 characterized in that the electrical evaluation circuit includes reactance means for measuring of the sensor coils upon voltage impression.

9. The inductive sensor unit (1) according to claim 1 characterized in that the plurality of planar sensor coils (L1, . . . , Li) are disposed on at least one side (L) of the printed circuit board (3).

10. The inductive sensor unit (1) according to claim 1 characterized in that the plurality of planar sensor coils (L1, . . . , Li) are disposed on both sides (L, (L') of the printed circuit board (3).

11. The inductive sensor unit (1) according to claim 10, characterized in that at least two sensor coils (L, L') are disposed opposite one another in planar fashion on opposite sides of the printed circuit board (3), said two sensor coils being connected in series.

12. The inductive sensor unit (1) according to claim 10, characterized in that the measurement signals of two sensor coils (L, L'), which are opposite one another in planar fashion on the two sides of the printed circuit board (3), are added together in the evaluation circuit (5, 11–17).

13. An inductive sensor unit (1), for detecting the position of a vehicle seat or for a gate shifting unit of an automatic transmission comprising:
   a plurality of sensor coils (L1, . . . , Li) disposed in planar fashion on a printed circuit board (3),
   a conductive actuation element (7), adapted to be guided, in spaced (a) relationship, on a path over the sensor coils (L1, . . . , Li),
   an electrical evaluation circuit (5, 11–17), for detecting changes in inductance of the sensor coils in accordance with a path position (x) of the actuation element (7) and for converting the changes into electrical signals corresponding to seat position signals or gear shifting signals, and
   wherein that the conductive actuation element (7) is guided, spaced apart (9, 9') on both sides, over the sensor coils (L1, . . . , Li).

14. The inductive sensor unit (1) according to claim 13, characterized in that the plurality of sensor coils (L1, . . . , Li) are disposed on both sides of the printed circuit board (3).

15. The inductive sensor unit (1) according to claim 14, characterized in that the electrical evaluation circuit (5, 11–17) includes means for detecting changes in the inductances of all the sensor coils (L1, . . . , Li) and an algorithm for converting said changes converts them by means of an algorithm into a current path position (x) of the actuation element (7).

16. An inductive sensor unit (1), for detecting the position of a vehicle seat or for a gate shifting unit of an automatic transmission comprising:
- a plurality of sensor coils (L1, . . . , Li) disposed in planar fashion on a printed circuit board (3),
- a conductive actuation element (7), adapted to be guided, spaced apart (a), on a path over the sensor coils (L1, . . . , Li),
- an electrical evaluation circuit (5, 11–17), for detecting changes in inductance of the sensor coils (L1, . . . , Li) in accordance with a path position (x) of the actuation element (7) and converting said changes into electrical signals corresponding to seat position signals or gear shifting signals,
- the electrical evaluation circuit (5, 11–17) for detecting the inductances of all the sensor coils (L1, . . . , Li) and converting changes into electrical signals further includes an algorithm for determining a current path position (x) of the actuation element (7).

17. The inductive sensor unit (1) according to claim 16, characterized in that the conductive actuation element (7) is guided, spaced apart (9, 9') on both sides, over the sensor coils (L1, . . . , Li).

18. The inductive sensor unit (1) according to claim 16, characterized in that the plurality of sensor coils (L1, . . . , Li) are disposed on both sides (L, L') of the printed circuit board (3).

19. The inductive sensor unit (1) according to claim 16, characterized in that the algorithm calculates the position (x) of the actuation element (7) based the local center of mass (x) of distributed sensor signals.

20. The inductive sensor unit (1) according to claim 16, characterized in that the algorithm interpolates the distributed sensor signals quadratically and calculates the position (x) as the extreme value of a parabola.

* * * * *